3,647,786
PREPARATION OF CEPHALOSPORIN
SULFOXIDES
Robin D. G. Cooper, Indianapolis, Ind., assignor to Eli
 Lilly and Company, Indianapolis, Ind.
No Drawing. Filed Oct. 3, 1968, Ser. No. 764,939
Int. Cl. C07d 99/24
U.S. Cl. 260—243 C                 10 Claims

ABSTRACT OF THE DISCLOSURE

Cephalosporins are oxidized to the corresponding cephalosporin sulfoxides by treatment with an inorganic peracid having a reduction potential of at least +1.5 volts and containing only nonmetallic elements, organic carboxylic peracids, or mixtures of hydrogen peroxide and an acid having a dissociation constant of at least $10^{-5}$.

BACKGROUND OF THE INVENTION

This invention concerns the oxidation of cephalosporins to the corresponding cephalosporin sulfoxides which are useful intermediates in the preparation of biologically active cephalosporin derivatives. In recent years antibiotics of the cephalosporin family have become increasingly important in the treatment of disease. The cephalosporins of choice have been derived by the chemical modification of fermentation derived cephalosporin C or by the chemical modification of penicillins in accordance with the process of Morin and Jackson (United States Pat. 3,275,626). This chemical modification is necessary in order to obtain products having sufficient biological activity to be of practical utility.

One method of chemical modification of cephalosporins is that described in copending application Ser. No. 703,-523 filed Feb. 7, 1968. This application describes a process whereby the 3-methyl group of a cephalosporin derived from penicillin by the Morin and Jackson process can be brominated and then reacted with a nucleophilic reagent to obtain a 3-methyl-functionalized derivative. In order to accomplish the bromination step the $\Delta^3$ double bond must be isomerized to the 2-position. At the completion of the reaction it is then necessary to isomerize the double bond back to the 3-position. This shift of the double bond back to the 3-position can be accomplished by oxidation of the $\Delta^2$ compound to obtain a sulfoxide. Reduction of the sulfoxide is accomplished in accordance with the process described in copending application Ser. No. 764,925, filed of even date herewith.

A method for the oxidation of certain cephalosporins to the corresponding sulfoxides is described by Cocker et al., J. Chem. Soc. 1966, 1142. The oxidizing agent employed in the Cocker et al. process is sodium periodate. This process results in only low yields of the sulfoxide from a $\Delta^2$-cephem-4-carboxylic acid or a $\Delta^3$-cephem-4-carboxylic acid or ester. Furthermore, the Cocker et al. process failed to oxidize a $\Delta^2$ ester to the sulfoxide. Therefore, there is a need for a process for the oxidation of a $\Delta^2$ or $\Delta^3$ cephalosporin compound to the corresponding sulfoxide.

SUMMARY

I have now discovered a process for the oxidation of a $\Delta^2$-cephem-4-carboxylic acid or ester or a $\Delta^3$-cephem-4-carboxylic acid or ester to the sulfoxide in good yield. In accordance with my process the cephalosporin to be oxidized to the sulfoxide is treated with at least about one mole of an oxidizing agent which may be an inorganic peracid having a reduction potential of at least +1.5 volts and containing only nonmetallic elements, an organic carboxylic peracid, or a mixture of hygrogen peroxide and an acid having a dissociation constant of at least $10^{-5}$. By means of my process I have obtained yields of the sulfoxides in excess of 60 percent, and in some cases the yields have been quantitative.

The sulfoxides obtained by me from my process are useful intermediates in known processes for the chemical modification of cephalosporins to obtain products having significant biological activity.

DESCRIPTION OF THE PREFERRED EMBODIMENT

My process is generally applicable to $\Delta^2$ and $\Delta^3$ cephalosporins of the following formulas:

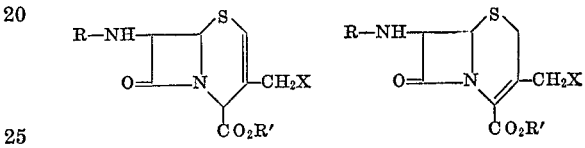

wherein R is an amino blocking group, X is hydrogen or a nucleophilic group, and $R_2$ is hydrogen, a silyl group, or an alkyl or aralkyl group containing from 1 to 20 carbon atoms. The specific nature of R, R' and X is unimportant to my process so long as due consideration is given to the presence of readily oxidizable groups within the molecule. If such groups are present and it is important that they be retained in the product in their unoxidized state, it is necessary to block these groups in some manner to prevent their oxidation. If the presence of such a group in its oxidized state is not detrimental to the product, it is necessary only that sufficient oxidizing agent be employed for the reaction. The latter situation might arise, for example, where the oxidizable group is present in a blocking group which will be removed later. Substituent groups that are present in cephalosporins are well known in the art.

Amino protecting groups are well known in the art and are described, for example, in U.S. Pats. 2,479,295 through 2,479,297, 2,562,407 through 2,562,411 and 2,623,876. Groups such as triphenylmethyl and trimethylsilyl may be employed; however, the preferred amino protecting group is an acyl group of the type well known in the penicillin and cephalosporin art. Such acyl groups are described, for example, in copending application Ser. No. 703,523. Specific examples of acyl blocking groups that are to be found in the penicillin and cephalosporin art are those shown below:

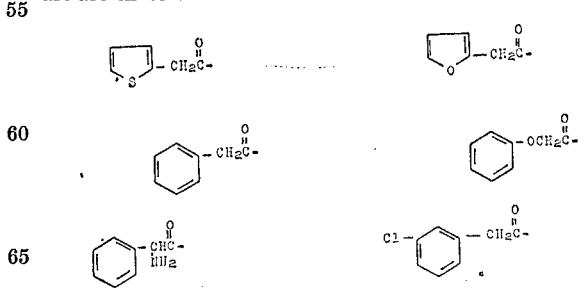

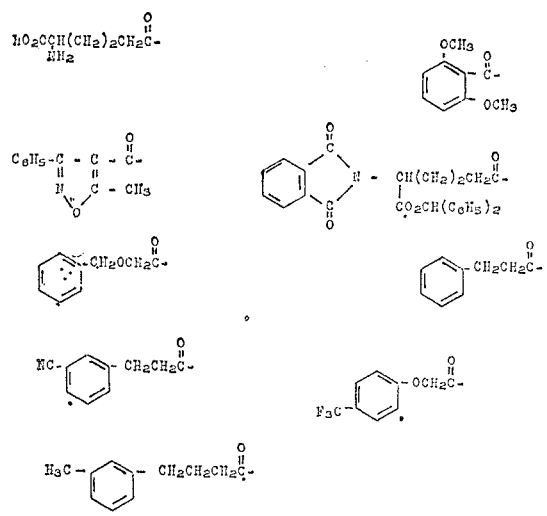

The carboxyl group in the 4-position of the starting material for our process may be present as the free acid, in which case R' is hydrogen, or it may be present as an ester. If the carboxyl group has been esterified R' is a silyl group or an alkyl or aralkyl group containing from 1 to about 20 carbon atoms. Frequently a carboxyl group is esterified to protect it during chemical modification of another portion of the molecule. In such cases it is preferred to use an esterifying group that may be easily removed later to regenerate the free acid. Such an easily removable group might be, for example, trimethylsilyl, t-butyl, benzyl, benzhydryl, 4-methoxybenzyl, or trichloroethyl. Other alkyl or aralkyl groups that may be employed as $R_1$ include methyl, ethyl, phenacyl, bis-(methoxyphenyl)methyl, p - nitrobenzyl, phthalimidomethyl, succinimidomethyl, and adamantyl. X may be hydrogen or a nucleophilic group, preferably one that is not subject to oxidation. Thus the preferred nucleophilic groups are cyano, hydroxy, alkoxy, and acyloxy groups. The alkoxy and acyloxy groups to be used are those containing from 1 to about 10 carbon atoms, such as methoxy, acetoxy, butoxy, and propionoxy. In general, nucleophilic groups containing nitrogen or sulfur are subject to oxidation and due allowance must be made for this when such groups are present.

The oxidizing agents to be used in my process are inorganic peracids having a reduction potential of at least +1.5 volts and containing only nonmetallic elements, organic carboxylic peracids, and a mixture of hydrogen peroxide and an acid having a dissociation constant of at least $10^{-5}$. Acceptable inorganic peracids are well defined by the reduction potential and the exclusion of metallic elements. Such peracids are known to those skilled in the art. The organic carboxylic peracids may be added as such or may be generated in situ by the use of at least an equivalent of hydrogen peroxide and a carboxylic acid. It is often desirable to use a large excess of the carboxylic acid as, for example, when acetic acid is used as the solvent. Oxidations with carboxylic peracids are known to those skilled in organic chemistry. I have also found that my process may be conducted employing hydrogen peroxide with catalytic amounts of an acid having a dissociation constant of at least $10^{-5}$. Small amounts of only one to two percent, or less, of acid are enough. Of course, larger amounts of acid may also be employed. The stronger the acid, the more effective is the mixture. I do not know if the oxidation proceeds through a peracid which is continuously regenerated by the hydrogen peroxide present or whether hydrogen peroxide is the oxidizing agent and the acid is acting as a catalyst for this oxidation. Specific examples of oxidizing agents for use in my process include periodic acid, persulfuric acid, m-chloroperbenzoic acid, peracetic acid, trifluoroperacetic acid, performic acid, permaleic acid, and mixtures of hydrogen peroxide with acetic acid, perchloric acid, or trifluoroacetic acid. Performic acid, trifluoroperacetic acid, and m-chloroperbenzoic acid are preferred.

I have also found that oxidations with carboxylic peracids are catalyzed by an acid having a dissociation constant of at least $10^{-5}$. The stronger the acid, the more effective it is as a catalyst. Catalytic quantities of as little as one to two percent or less of the acid are sufficient. Acids that exhibit some catalytic activity in this oxidation include acetic acid, perchloric acid, and trifluoroacetic acid.

The point of attack of the oxidation is the sulfur atom in the cephalosporin nucleus. This sulfur atom is oxidized to the sulfoxide. If the molecule contains other readily oxidizable groups, such as a free amine or a strongly nucleophilic sulfur, such groups will probably also be oxidized. The presence of other oxidizable groups should be considered prior to subjecting the molecule to my process and adequate steps taken to compensate for or prevent their oxidation.

For best results at least one equivalent of oxidizing agent per mole of cephalosporin compound should be employed. Preferably a slight excess of from 10 to 20 percent of the oxidizing agent is employed and larger excesses of up to 10 fold or more may be employed. These ratios of oxidizing agent to cephalosporin are based on the assumption that the ring sulfur is the only oxidizable group present in the molecule. If other oxidizable groups are present, sufficient additional oxidizing agents should be employed to oxidize such groups.

To minimize further oxidation of the sulfoxide to the sulfone mild conditions are recommended for my process. The reaction should be conducted at a temperature within the range of $-50°$ to $+100°$ C. Preferably, the temperature will be within the range of $-10°$ to $+40°$ C.

Our process will be further illustrated by the following examples:

EXAMPLE 1

A solution of 1.2 g. of ethyl 3-methy-7-(phenoxyacetamido)-$\Delta^2$-cephem-4-carboxylate and 750 mg. of m-chloroperbenzoic acid in 30 ml. of chloroform was stirred at room temperature for two hours. The reaction mixture was washed with sodium bisulfite solution and then sodium carbonate solution. The chloroform solution was dried over magnesium sulfate and the solvent was removed in vacuo to give 940 mg. of a buff-colored solid which crystallized from benzene/ether as white crystals. The nuclear magnetic resonance spectrum showed the product to be the $\Delta^3$ sulfoxide.

EXAMPLE 2

A solution of 1.61 g. (3.36 mmoles) of trichloroethyl 3-methyl-7-(phenoxyacetamido)-cephem - 4 - carboxylate comprising mostly the $\Delta^3$ isomer but containing some $\Delta^2$ isomer in 15 ml. of acetic acid was cooled in an ice bath and 0.76 g. (6.72 mmoles) of a 30 percent solution of hydrogen peroxide was added. The mixture was stirred overnight at room temperature. The solvent was removed in vacuo, the residue was taken up in methylene chloride, and the solution was washed with water and 5 percent sodium bicarbonate solution. The crude product (1.5 g.) was recovered from the methylene chloride layer and chromatographed on silica gel using a benzene-ethyl acetate solvent. Suitable combination of the fractions gave 50 mg. of sulfone, 900 mg. of a first sulfoxide and 160 mg. of a second sulfoxide. Structures were established from spectral data. All products had the double bond in the 3-position. The two sulfoxides were isomers differing in the configuration of the sulfur atom. Recrystallization of sulfoxide I gave a material melting at 176° to 178° C., with decomposition, while recrystallized sulfoxide II melted at 186° to 187° C., with decomposition.

EXAMPLE 3

A solution of trichloroethyl 3-methyl-7-(phenoxyacetamido)-cephem-4-carboxylate comprising approximately 65 percent of the $\Delta^3$ isomer and 35 percent of the $\Delta^2$ isomer (11.7 g., 24.4 mmoles) in 100 ml. of chloroform was cooled in ice. A solution of 5.08 g. (25 mmoles) of 85 percent m-chloroperbenzoic acid in 50 ml. of chloroform was added slowly with stirring while maintaining the temperature of the reaction mixture below 20° C. Upon completion of the addition the reaction mixture was stirred one additional hour at room temperature. The reaction mixture was washed successively with 5 percent sodium bicarbonate solution and water and dried over sodium sulfate. Removal of the chloroform in vacuo gave 13.3 g. of a crude product which was crystallized from acetone-ether to give 4.9 g. of sulfoxide I containing a small amount of sulfoxide II. Chromatography of the mother liquors yielded more product.

EXAMPLE 4

A 3:1 mixture of the $\Delta^2$ and $\Delta^3$ isomers of p-methoxybenzyl 3-acetoxymethyl - 7 - phenoxyacetamido-cephem-4-carboxylate (125 mg.) was dissolved in 4 ml. of chloroform and the solution was cooled. To this solution was added a solution of 40 mg. of 85 percent m-chloroperbenzoic acid in chloroform. After stirring for 4 hours at room temperature the reaction mixture was diluted with chloroform and the solution was washed twice with saturated aqueous sodium bicarbonate solution, once with saturated sodium chloride solution, dried over magnesium sulfate, filtered, and evaporated to give 127 mg. of crude p-methoxybenzyl 3 - acetoxymethyl-7-phenoxy-acetamido-$\Delta^3$-cephem-4-carboxylate-1-oxide. This crude product was crystallized from methanol to give 95 mg. of sulfoxide melting at 161° to 163° C. This product was shown to be identical to an authentic sample by mixed melting point and comparison of nuclear magnetic resonance spectra.

EXAMPLE 5

To a solution of 372 mg. of p-methoxybenzyl 3-cyanomethyl-7-phenoxyacetamido-$\Delta^2$-cephem-4-carboxylate in 300 ml. of isopropyl alcohol was added a solution of 133 mg. of m-chloroperbenzoic acid in isopropyl alcohol. The reaction mixture was stirred overnight at room temperature. At the end of this reaction period the mixture was filtered to recover 210 mg. of p-methoxybenzyl 3-cyanomethyl - 7 - phenoxyacetamido-$\Delta^3$-cephem-4-carboxylate-1-oxide with a melting point of 204° to 207° C. which had precipitated from the reaction mixture. The filtrate was evaporated to dryness and the residue was taken up in ethyl acetate, the solution washed successively with sodium bicarbonate solution and sodium chloride solution, dried over magnesium sulfate, filtered, and evaporated to give 160 mg. of an oil from which 45 mg. of sulfoxide crystallized after methanol was added. The structure of the sulfoxide was verified by spectral methods.

EXAMPLE 6

To a solution of 100 mg. (0.2 mmole) of p-methoxybenzyl 3-methoxymethyl-7-phenoxyacetamido-$\Delta^2$-cephem-4-carboxylate in 40 ml. of isopropyl alcohol was added 37 mg. of 85 percent m-chloroperbenzoic acid in 4 ml. of isopropyl alcohol. Within a few minutes the sulfoxide began to precipitate. The reaction mixture was stirred for one hour and 63 mg. of p-methoxybenzyl 3-methoxymethyl - 7 - phenoxyacetamido-$\Delta^3$-cephem-4-carboxylate-1-oxide was collected by suction filtration. This product had a melting point of 190° to 192° C. The structure was verified by spectral means and elemental analysis.

EXAMPLE 7

To a solution of 581 mg. (1.2 mmoles) of p-methoxybenzyl 3-hydroxymethyl-7-phenoxyacetamido-$\Delta^2$-sephem-4-carboxylate in 70 ml. of isopropyl alcohol and 6 ml. of methylene chloride was added 244 mg. (1 equivalent) of 85 perecnt m-chloroperbenzoic acid in 11 ml. of isopropyl alcohol. Within minutes a flocculent precipitate appeared. After stirring for four hours the reaction mixture was filtered, giving 427 mg. of p-methoxybenzyl 3-hydroxymethyl - 7 - phenoxyacetamido-$\Delta^3$-cephem-4-carboxylate-1-oxide having a melting point of 157° to 161° C. A second crop of crystals could be obtained from the mother liquor. The structure was confirmed by spectral means and elemental analysis.

EXAMPLE 8

To a solution of 15.33 g. (0.0328 mole) of p-methoxybenzyl 3-methyl-7-phenoxyacetamido-$\Delta^3$-cephem - 4 - carboxylate in 1.5 l. of isopropyl alcohol-methylene chloride was added 6.7 g. (1 equivalent) of 85 percent m-chloroperbenzoic acid in 100 ml. of isopropyl alcohol. The sulfoxide began to precipitate almost immediately. After stirring overnight the reaction mixture was filtered to give 12.6 g. of p-methoxybenzyl 3-methyl-7-phenoxyacetamido-$\Delta^3$-sephem-4-carboxylate-1-oxide having a melting point of 195° to 195.5° C. A second crop of 1.7 g. of lower melting material was obtained from the mother liquor. The structure of the sulfoxide was confirmed by elemental analysis and spectral means.

EXAMPLE 9

To a stirred, cooled solution of 0.404 g. (1 mmole) of t-butyl 3-methyl-7-phenoxyacetamido-$\Delta^2$-cephem - 4 - carboxylate in 25 ml. of methylene chloride was added dropwise 5 ml. of trifluoroacetic acid containing 0.12 ml. of 30 percent hydrogen peroxide. Upon completion of the addition the reaction mixture was washed successively with water and 10 percent sodium bicarbonate solution and dried over sodium sulfate. Evaporation of the solvent yielded 0.360 g. of product which was shown by a nuclear magnetic resonance spectrum to be a mixture of t-butyl 3 - methyl-7-phenoxyacetamido-$\Delta^2$-cephem-4-carboxylate-1-oxide and t-butyl 3-methyl-7-phenoxyacetamido-$\Delta^3$-cephem-4-carboxylate-1-oxide.

EXAMPLE 10

To a stirred solution of 0.400 g. of the same starting material as employed in Example 9 in 20 ml. of methylene chloride was added 5 ml. of 98 percent formic acid containing 0.2 ml. of 30 percent hydrogen peroxide. Upon completion of the addition the reaction mixture was washed successively with water and 10 percent sodium bicarbonate solution, dried over sodium sulfate, and evaporated to dryness to give 0.320 g. of crude product. The nuclear magnetic resonance spectrum of the product showed it to be pure $\Delta^3$ sulfoxide.

EXAMPLE 11

The starting material employed in this example is the same as that employed in Example 9. To a stirred solution of 0.600 g. (1.5 mmoles) of this material in 50 ml. of methylene chloride was added 1.0 ml. of 30 percent hydrogen peroxide containing 1 drop of 70 percent perchloric acid. The reaction mixture was stirred for nine and one-half hours, then washed successively with water and 10 percent sodium bicarbonate solution, dried over sodium sulfate, and evaporated to dryness to give 0.530 g. of crude product. The mixture was chromatographed over 50 g. of silica gel containing 15 percent water to give pure $\Delta^3$ sulfoxide whose structure was verified by nuclear magnetic resonance spectroscopy.

EXAMPLE 12

Once again the starting material is that employed in Example 9. To a solution of 0.600 g. (1.5 mmoles) of this material in 20 ml. of methylene chloride was added approximately 4.5 mmoles of permaleic acid prepared from hydrogen peroxide and maleic anhydride. The reaction mixture was stirred for three hours, then washed successively with water and 10 percent sodium bicarbonate solution, dried over sodium sulfate, and evaporated to dryness. The crude product (0.52 g.) was chromatographed over 60 g. of silica gel to yield 0.40 g. of pure $\Delta^3$ sulfoxide whose structure was verified by nuclear magnetic resonance spectroscopy.

EXAMPLE 13

To a stirred solution of 0.200 g. of the starting material employed in Example 9 in 20 ml. of ether was added dropwise a solution of 0.100 g. of periodic acid in 25 ml. of ether. Upon completion of the addition the reaction mixture was washed successively with water and 10 percent sodium bicarbonate solution and dried over sodium sulfate. Evaporation of the solvent gave 0.196 g. of crude product whose nuclear magnetic resonance spectrum identified it as the expected $\Delta^3$ sulfoxide.

EXAMPLE 14

To a stirred, cooled solution of 12.2 g. of t-butyl 3-methyl-7-phenoxyacetamido-$\Delta^2$-cephem - 4 - carboxylate in 500 ml. of methylene chloride was added dropwise 5.66 g. of 85 percent m-chloroperbenzoic acid in 500 ml. of methylene chloride. Upon completion of the addition the reaction mixture was washed successively with 10 percent sodium bicarbonate solution and water and evaporated to dryness to give 12.0 g. of a gummy product which crystallized upon standing. The crystals were washed with ether to give 10.0 g. of product having a melting point of 127° to 128° C. The nuclear magnetic resonance spectrum of this compound showed it to be a $\Delta^2$ sulfoxide. The ether wash from the above crystals yielded 0.110 g. of another crystalline sulfoxide having a melting point of 160° to 161° C. The nuclear magnetic resonance spectrum of this sulfoxide showed it, too, to be a $\Delta^2$ sulfoxide. The difference in structure of these two sulfoxides apparently originates with the configuration of the sulfoxide sulfur. Both of these $\Delta^2$ sulfoxides were converted to the $\Delta^3$ sulfoxide upon stirring in methanol. The $\Delta^3$ structure was shown by the nuclear magnetic resonance spectrum.

EXAMPLE 15

To a stirred solution of 1.00 g. of t-butyl 3-hydroxymethyl - 7 - phenoxyacetoamido-$\Delta^2$-cephem-4-carboxylate in 150 ml. of isopropyl alcohol and 25 ml. of methylene chloride at ice temperature was added dropwise a solution of 0.430 g. of 85 percent m-chloroperbenzoic acid in 65 ml. of isopropyl alcohol. Upon completion of the addition the solvents were removed under vacuum and the residue was dissolved in ethyl acetate. The ethyl acetate solution was washed successively with 10 percent sodium bicarbonate solution and water and the ethyl acetate was evaporated to dryness to give 1.10 g. of crude product which was crystallized from ethyl acetate. The nuclear magnetic resonance spectrum showed the product to be t-btuyl 3-hydroxymethyl-7-phenoxyacetamido-$\Delta^3$-cephem-4-carboxylate-1-oxide.

EXAMPLE 16

To a stirred, cooled solution of 0.600 g. of trichloroethyl 3-methyl - 7 - phenoxyacetamido-$\Delta^3$-cephem-4-carboxylate in 50 ml. of methylene chloride was added 2 ml. of trifluoroacetic acid and 0.20 ml. of 30 percent hydrogen peroxide. The addition was completed in 20 minutes and the reaction mixture was then washed successively with water and 10 percent sodium bicarbonate solution, dried over sodium sulfate, and evaporated to dryness to give 0.616 g. of product. The nuclear magnetic resonance spectrum of the product showed it to be pure trichloroethyl 3-methyl - 7 - phenoxyacetamido-$\Delta^3$-cephem-4-carboxylate-1-oxide.

EXAMPLE 17

A solution of 3-methyl-7-phenoxyactamido-$\Delta^3$-cephem-4-carboxylic acid (3.48 g., 10.0 mmoles) in 300 ml. of methylene chloride and 30 ml. of isopropyl alcohol was stirred and cooled in an ice bath while a solution of 2.02 g. of 85 percent m-chloroperbenzoic acid in 35 ml. of methylene chloride and 35 ml. of isopropyl alcohol was added over a period of 30 minutes. The desired 3-methyl-7-phenoxyactamido-$\Delta^3$-cephem - 4 - carboxylic acid-1-oxide crystallized from the solution. The mixture was stirred an additional 30 minutes after completion of addition and the product was recovered by filtration and washed with methylene chloride to give 2.95 g. of pure product having a melting point of 189° to 190° C., with decomposition.

EXAMPLE 18

3 - propionyloxymethyl - 7 - [2-(thienyl)actamido]-$\Delta^2$-cephem-4-carboxylic acid (1 mmole) was dissolved in a minimal amount of chloroform at room temperature and 0.95 mmole of 85 percent m-chloroperbenzoic acid was added. The mixture was warmed slightly, with stirring, and precipitation commenced. After the reaction mixture had been stirred for 15 minutes at room temperature, the solvent was concentrated to a small volume and the precipitated crystals were recovered by filtration and recrystallized from ethanol. A 47 percent yield of 3-propionyloxymethyl-7-[2-(thienyl)acetamido]-$\Delta^3$-cephem - 4 - carboxylic acid-1-oxide having a melting point of 178° to 179° C., with decomposition, was obtained. The structure was confirmed by elemental analysis and ultraviolet and nuclear magnetic resonance spectra.

EXAMPLE 19

Example 18 was repeated using the corresponding 3-butanoyloxymethyl derivative rather than the 3-propionyloxymethyl derivative. The 3-butanoyloxymethyl - 7 - [2-(thienyl)-actamido]-$\Delta^3$-cephem-4-carboxylic acid-1-oxide having a melting point of 170° to 172° C., with decomposition, was obtained in a 45 percent yield.

EXAMPLE 20

Example 18 was repeated employing the corresponding 3-($\alpha$-methylpropionyloxy)methyl derivative. The corresponding 1-oxide was obtained in 57 percent yield. The product had a melting point of 173° to 174° C., with decomposition. The proposed structure was confirmed by elemental analysis and ultraviolet and nuclear magnetic resonance spectra.

EXAMPLE 21

Example 18 was repeated employing the corresponding 3-(cyclobutylformyloxy)methyl derivative. The desired 1-oxide was obtained in a 47 percent yield. The product had a melting point of 170° to 171° C., with decomposition. The structure was confirmed by elemental analysis and ultraviolet and nuclear magnetic resonance spectra.

It is evident from the above examples that my process is generally applicable to the oxidation of $\Delta^2$ and $\Delta^3$ cephalosporin acids and esters. This is in contrast to the prior art use of sodium periodate which does not oxidize $\Delta^2$ esters and results in low yields of other cephalosporin sulfoxides. The oxidation of $\Delta^2$ esters is especially important in view of the process disclosed in copending application Ser. No. 703,523.

It is also to be noted from the examples that the oxidation of a $\Delta^2$ cephalosporin frequently results in the formation of a $\Delta^3$ sulfoxide; i.e., a shift of the double bond from the 2- to the 3-position has occurred. This shift of the double bond occurs after oxidation of the sulfur atom and not before as evidenced by the isolation of a $\Delta^2$ sulfoxide in Examples 9 and 14.

I claim:
1. A method for the oxidation of a cephalosporin having the formula

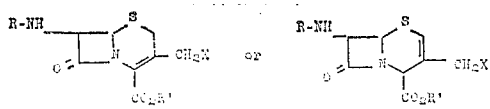

wherein R is an amino blocking group, X is hydrogen or a nucleophilic group, and R' is hydrogen, a silyl group, or an alkyl or aralkyl group containing from 1 to 20 carbon atoms, to obtain a cephalosporin sulfoxide which comprises treating said cephalosporin with at least about 1 equivalent of an oxidizing agent at a temperature within the range of −50° C. to +100° C., said oxidizing agent being selected from the class consisting of inorganic peracids having a reduction potential of at least +1.5 volts and containing only nonmetallic elements, organic carboxylic peracids, and mixtures of hydrogen peroxide and an acid having a dissociation constant of at least $10^{-5}$.

2. A method as in claim 1 wherein the temperature is within the range of −10° to 40° C.

3. A method as in claim 1 wherein the oxidizing agent is performic acid.

4. A method as in claim 1 wherein the oxidizing agent is m-chloroperbenzoic acid.

5. A method as in claim 1 wherein the oxidizing agent is trifluoroperacetic acid.

6. A method as in claim 1 wherein the cephalosporin is a $\Delta^2$ cephalosporin ester having the formula

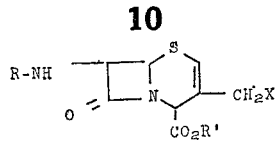

wherein R is an amino blocking group, R' is a silyl group or an alkyl or aralkyl group containing 1 to 20 carbon atoms, and X is hydrogen or a nucleophilic group.

7. A method as in claim 6 wherein the temperature is within the range of −10° to +40° C.

8. A method as in claim 6 wherein the oxidizing agent is performic acid.

9. A method as in claim 6 wherein the oxidizing agent is m-chloroperbenzoic acid.

10. A method as in claim 6 wherein the oxidizing agent is trifluoroperacetic acid.

References Cited

Cocker, J. Chem. Soc., 1966, pp. 1142–1151 (London).

NICHOLAS S. RIZZO, Primary Examiner